June 4, 1968  S. W. LONG  3,386,263
ROTARY TABLE MASTER BUSHING
Filed Oct. 22, 1965  4 Sheets-Sheet 2

SPENCER W. LONG
INVENTOR.

BY Lyon & Lyon
ATTORNEYS

June 4, 1968  S. W. LONG  3,386,263
ROTARY TABLE MASTER BUSHING
Filed Oct. 22, 1965  4 Sheets-Sheet 3

PRIOR ART  PRIOR ART  PRIOR ART

SPENCER W. LONG
INVENTOR.

BY Lyon & Lyon
ATTORNEYS

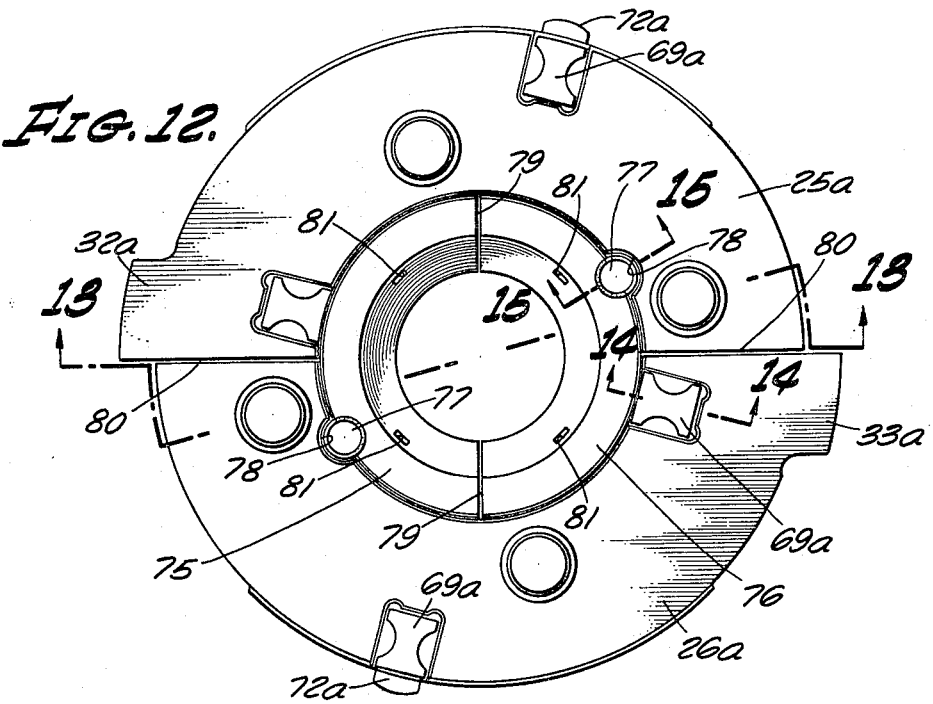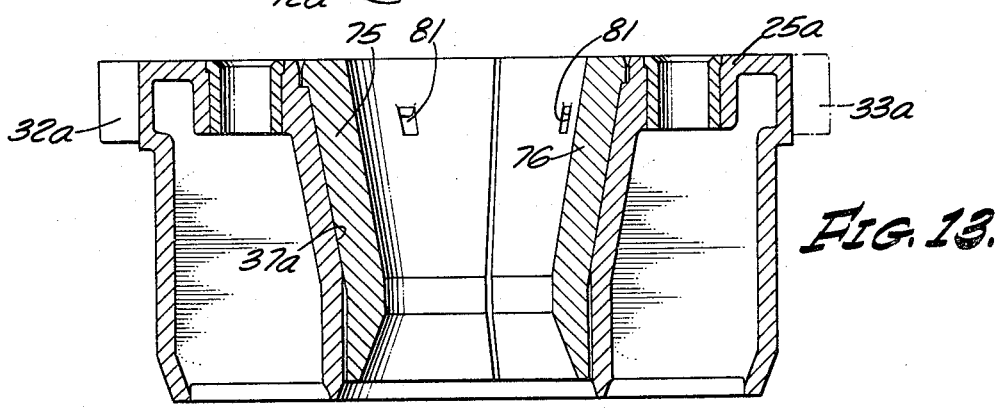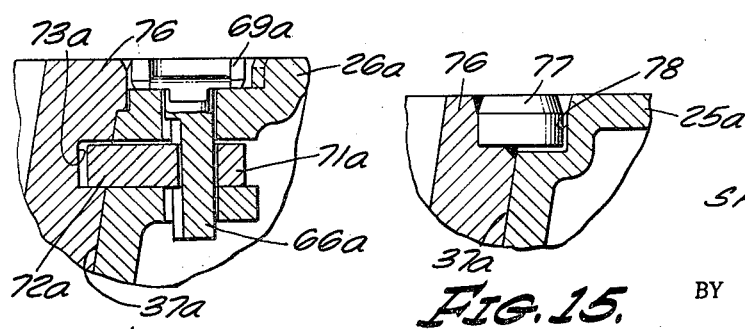

United States Patent Office 3,386,263
Patented June 4, 1968

3,386,263
ROTARY TABLE MASTER BUSHING
Spencer W. Long, Inglewood, Calif., assignor to Armco Steel Corporation, Middletown, Ohio, a corporation of Ohio
Filed Oct. 22, 1965, Ser. No. 501,565
16 Claims. (Cl. 64—23.5)

ABSTRACT OF THE DISCLOSURE

The master bushing assembly for a well drilling rotary machine comprises duplicate split halves each having a laterally extending driving lug provided with a radial driving face, the master bushing halves each being provided with axially extending pin sockets for reception of driving pins on a kelly bushing.

---

This invention relates to well drilling apparatus and is particularly directed to a novel form of rotary table and bushings for turning the kelly and handling drill pipe.

In conventional apparatus, the master bushing rests in the rotary table and is provided with a tapered bore to receive wedge-shaped pipe-gripping slips for engaging the outer surface of drill pipe. The master bushing is split axially into two sections to facilitate removal from the rotary table so that the maximum opening in the rotary table may be used when lowering the bit through the rotary table. The split master bushing is commonly provided with a square portion which is received within a square recess in the rotary table, so that the rotary table may turn the master bushing. The kelly drive bushing has been driven by a similar square recess in the master bushing, or by parallel downward extending drive pins. Drive pins on the kelly bushing are often used when deep drilling operations require a long tapered bore in the master bushing to accommodate long drill pipe slips; in such case the tapered bore extends to the top surface of the master bushing, thereby preventing the use of a drive square in the master bushing.

Heretofore the drive pins on the kelly bushing have been successfully used only with solid master bushings. These solid master bushings have been used to provide accurate spacing for the drive pin sockets and to provide solid support for long drill pipe slips and heavy loads. Solid master bushings have the disadvantage of being awkward to handle, and being time-consuming to remove and replace when large diameter bits, tools, casing, etc. are to be lowered through the rotary table.

The principal object of this invention is to provide a split type master bushing which will remain firmly seated in the rotary table opening and maintain accurate location and spacing of pin sockets for kelly bushing drive pins under forces exerted when driving the kelly and which will rigidly support the slips when handling drill pipe. The master bushing has a circular shape with external diameters substantially equal to the central openings in the rotary table to provide solid backing for drill pipe slips, and to maintain the pin drive sockets for the kelly bushing in accurate location. Each master bushing section has a single outward extending driving lug, and the conventional drive square is eliminated. The driving lugs and the sockets for the drive pins of the kelly bushing are so located on the master bushing sections that the driving forces act to keep the bushing sections seated against the table opening and act to maintain accurate spacing of the drive pin sockets.

Other and more detailed objects and advantages will appear hereinafter.

In the drawings, FIGURE 1 is a sectional elevation showing a preferred form of the invention and taken substantially on the lines 1—1 as shown in FIGURE 2.

FIGURE 12 is a top plan view showing a modified form of master bushing assembly embodying this invention.

FIGURE 13 is a sectional elevation taken substantially on the lines 13—13 as shown in FIGURE 12.

FIGURE 14 is a sectional detail taken substantially on the lines 14—14 as shown in FIGURE 12.

FIGURE 15 is a sectional detail taken substantially on the lines 15—15 as shown ni FIGURE 12.

Figure 1:
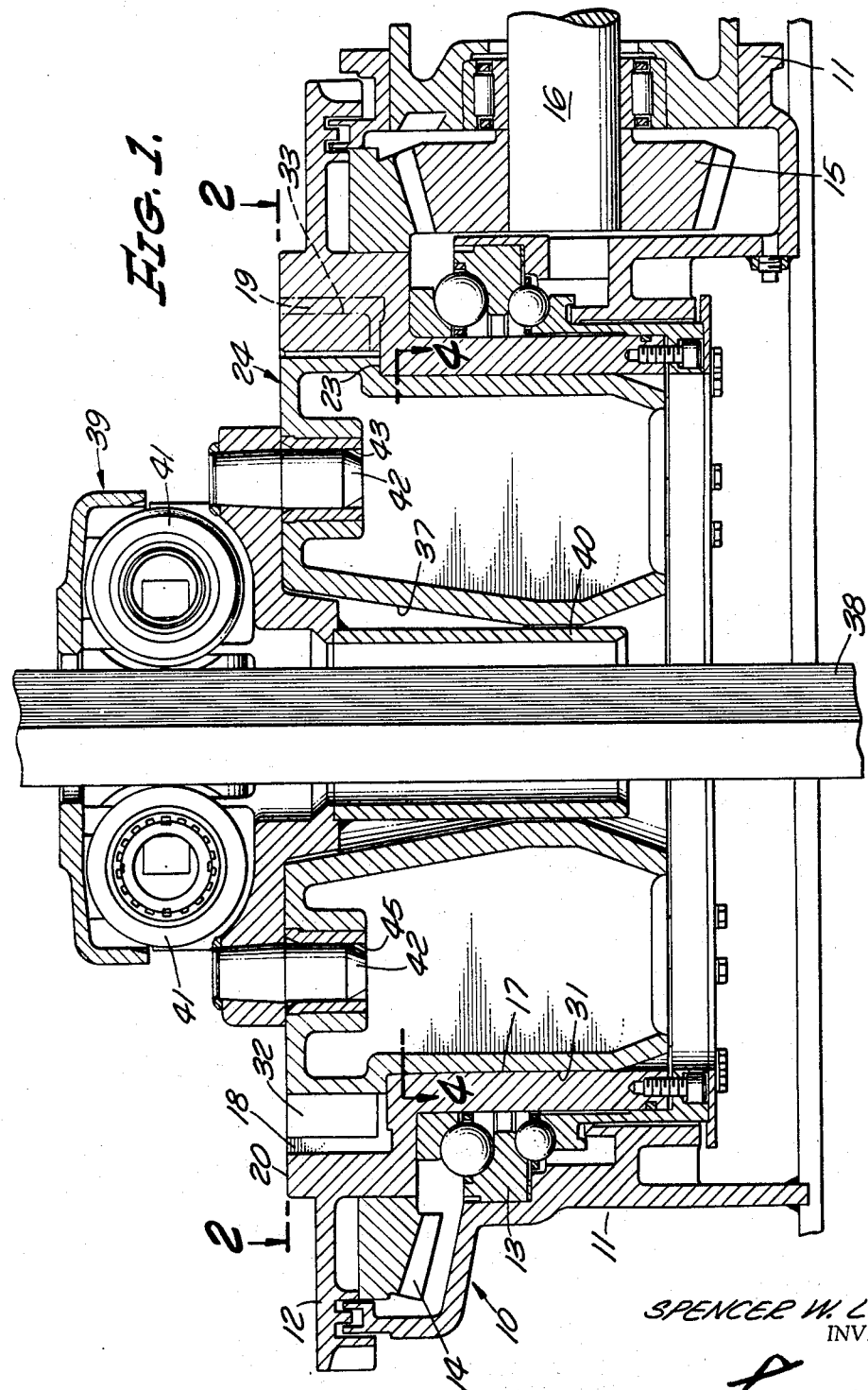

Referring to the drawings, the rotary machine generally designated 10 includes a stationary base 11 and a rotary table 12. A bearing assembly 13 on the base 11 supports the table 12 for rotary movement. A ring gear 14 fixed on the table is driven by a pinion gear 15 fixed on a pinion shaft 16 rotatably supported on the base 11.

The rotary table 12 is provided with a stepped central vertical opening 17 and 17a extending therethrough. Drive pockets 18 and 19 are provided in the rotary table 12 at diametrically opposed positions and each extends to the upper surface 20 of the rotary table. Each pocket also extends to the central opening 17. Each of the pockets has a radial wall 21, 22.

A master bushing assembly generally designated 24 is split longitudinally to form a pair of duplicate master bushing sections 25 and 26 having confronting faces 27, 28 and 29, 30. The outer surfaces 31, 31a of the bushing sections are circular and they are adapted to be received and supported on the shoulder 23 joining the parts of the stepped central opening 17, 17a in the rotary table 12. Each bushing section has a single driving lug 32, 33, extending outward beyond the outer surface of the bushing section and received in one of the drive pockets 18, 19. The driving lug 32 extends into pocket 18 between the radial wall 21 and the clearance wall 21a spaced therefrom, and is provided with a radial face 34 for engagement with the radial wall 21 of the pocket 18. Similarly, the driving lug 33 extends into the pocket 19 between the radial wall 22 and the clearance wall 22a spaced therefrom, and has a radial face 35 which contacts the radial wall 22 of the pocket 19. When the parts are in the position shown in the drawings, the radial faces 34 and 35 of the driving lugs 32 and 33, the radial walls 21 and 22 of the table pockets 18 and 19, the radial face 27 of the bushing section 25 and radial face 30 of the bushing section 26 all lie in the same vertical plane which passes through the rotary axis of the rotary table 12. The surface 29 on the bushing section 25 and the surface 28 on the bushing section 26 lie on opposite sides of this common plane and have a small clearance space therewith, which clearance space facilitates installation and removal of the bushing sections with respect to the rotary table 12.

The master bushing sections 25 and 26 cooperate to define a central tapered bore 37 for reception of wedge-shaped pipe-engaging slips, not shown. The central bore 37 extends to the upper surface of the master bushing and its taper portion is relatively long in order to accommodate the long slips employed for gripping heavy strings of pipe. A kelly bushing generally designated 39 is provided with a pilot skirt 40 which extends into the bore 37. The kelly bushing 39 rests on the upper surface of the master bushing 24 and is provided with rollers 41 which engage the faces of the kelly 38. The kelly bushing 39 is provided with four equally spaced downward extending parallel drive pins 42, and these drive pins are received in upward opening sockets 43, 44, 45, 46 provided on the master bushing 24. The pin sockets 43 and 44 are located on the bushing section 25 and the pin sockets 45 and 46 are located on the bushing section 26. Driving torque transmitted by the pinion 15 to the ring gear 14 causes the rotary table 12 to drive the lugs 32 and 33 on the master bushing sections and these in turn drive the kelly bushing 39 through the drive pins 42. The rollers 41 apply driving torque to turn the kelly 38 while at the same time permitting it to move freely in a vertical direction.

The locations of the pin sockets 43, 44, 45 and 46 on the master bushing sections 25 and 26 are not symmetrical with respect to each bushing section but on the contrary the pin socket 43 is located close to the surface 29 on the bushing section 25, and the pin socket 45 is located close to the surface 28 on the bushing section 26. The pin socket 43 on the bushing section 25 is remote from the driving lug 32 on that same bushing section. Similarly, the pin socket 45 on the bushing section 26 is remote from the driving lug 33 on the same bushing section. Pin socket 44 is located 90 degrees from pin socket 43, and similarly, pin socket 46 is located 90 degrees from pin socket 45.

Figures 6, 7, 8:
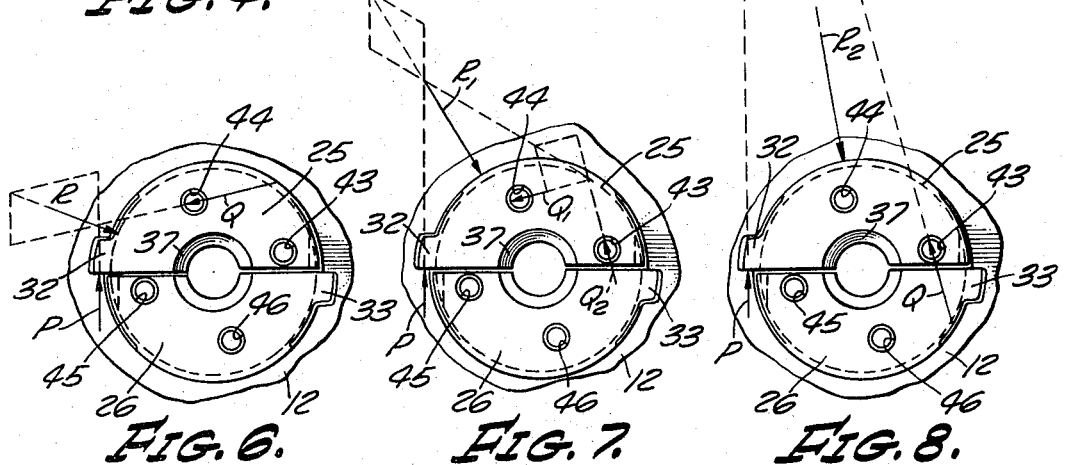
FIGURES 6, 7 and 8 are diagrammatic illustrations showing how the driving forces between the table and the master bushing sections and between the master bushing sections and the kelly bushing are of a direction and location to force the master bushing sections outward against the central opening in the rotary table.

FIGURES 6, 7 and 8 are force diagrams showing how this arrangement of drive lugs and sockets results in holding the master sections in solid engagement with the rotary table opening 17 under the driving forces imparted by the rotary table to the master bushing sections and by the master bushing sections to the kelly bushing 39. In FIGURE 6 the force P represents the driving force applied by the rotary table 12 to the driving lug 32 on the master bushing section 25. The force Q represents the driving reaction from a kelly drive pin 42 in the socket 44, assuming that all force between kelly bushing 39 and master bushing section 25 is taken by this particular socket. The force R is the reaction of the rotary table 12 against the master bushing section 25, resulting from the forces P and Q. In FIGURE 7, force P is the same but the forces $Q_1$ and $Q_2$ assume that the sockets 44 and 43 are equally loaded. The force $R_1$ represents the reaction of the rotary table 12 against the master bushing section 25 resulting from the forces P, $Q_1$ and $Q_2$. In FIGURE 8, the force P is the same and the force Q represents the driving reaction on the socket 43, assuming that this socket carries all of the force between kelly bushing 39 and master bushing section 25. The force $R_2$ is the reaction of the rotary table 12 against the master bushing section 25 resulting from the forces P and Q. In all three views, FIGURES 6, 7 and 8, it is apparent that the reaction forces R, $R_1$, $R_2$ of the rotary table 12 against the master bushing section 25 are toward the axis of rotation and not away from it. In other words, the driving forces from the rotary table 12 and the driving reactions from the kelly bushing 39 are of a direction and location to force the master bushing section 25 outward against the circular bore in the rotary table 12. Since the bushing section 26 is a duplicate of the bushing section 25, the same forces and reactions occur and both bushing sections are held in solid engagement with the bore of the rotary table by reason of the driving forces and reactions. Although the force diagrams of FIGURES 6, 7 and 8 do not take into account the action of centrifugal force, such centrifugal force serves to supplement the action of maintaining the split master bushing sections 25 and 26 in contact with the circular opening in the rotary table 12.

Figures 9, 10, 11:
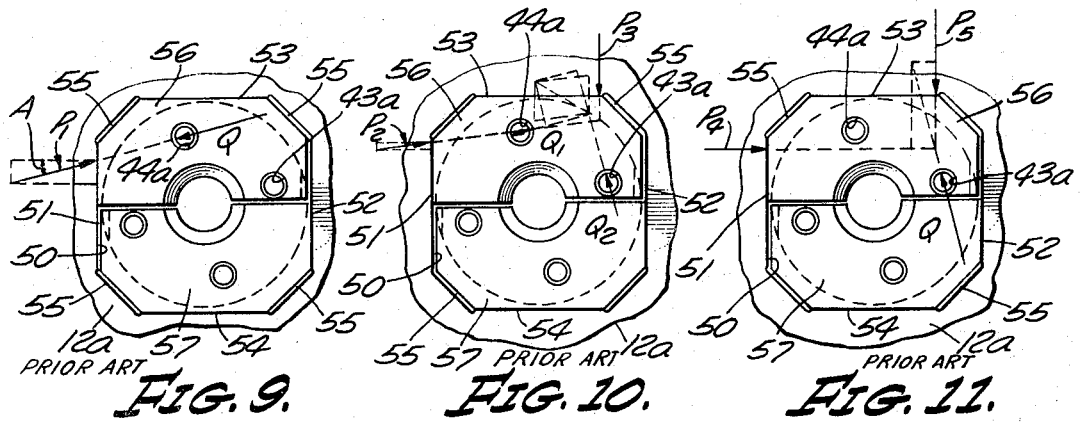
FIGURES 9, 10 and 11 show similar force diagrams for a master bushing having a conventional "square" drive from the rotary table, and kelly bushing drive pin socket locations identical to those of FIGURES 6, 7 and 8.

The force diagrams of FIGURES 9, 10 and 11 show the distribution of driving forces on a split master bushing construction having conventional square driving faces and kelly bushing drive pin socket locations identical to those of FIGURES 6, 7 and 8. The conventional rotary table 12a has a "square" recess 50 in its upper surface and this recess has parallel faces 51 and 52 and parallel faces 53 and 54. The corners of the "square" are beveled off to provide clearance spaces 55. The split master bushing sections 56 and 57 have a conventional "square" shape with the corners beveled away. In this construction, location of the pin sockets 43a and 44a in the same relative position as that shown in FIGURES 6, 7 and 8 does not result in holding the master bushing sections in solid engagement with the rotary table 12a in all cases. In FIGURE 9, it is assumed that all of the driving reaction is taken by the socket 44a. This compares to FIGURE 6. In FIGURE 10, it is assumed that half of the total driving reaction is taken by each socket 43a and 44a. This compares to FIGURE 7. In FIGURE 11, it is assumed that all of the driving reaction is taken by the socket 43a. In FIGURE 9 the driving force $P_1$ would have to be equal to and colinear with driving reaction Q to prevent inward displacement of master bushing section 56 relative to rotary table 12a. Since angle A is much greater than the angle of friction for the contacting surfaces of master bushing section 56 and rotary table 12a, driving force $P_1$ cannot be colinear with driving reaction Q. Hence in FIGURE 9 inward displacement of master bushing section 56 relative to rotary table 12a is not prevented. Since both centrifugal force on master bushing section 56 and driving reaction Q are variable, alternate inward and outward displacement of master bushing section 56 relative to rotary table 12a would occur, thereby causing misalignment and producing excessive wear. Inspection of the force diagram of FIGURE 10 reveals that a similar though not so pronounced tendency toward inward displacement of master bushing section 56 relative to rotary table 12a exists. No such tendency exists when all of the driving reaction between master bushing section 56 and kelly bushing 39 is taken by socket 43a as shown in FIGURE 11.

Due to manufacturing inaccuracies and wear of parts, the direction and location of the resultant forces will vary between the extremes shown in FIGURES 6, 7 and 8 for the device embodying this invention, and will vary between the extremes shown in FIGURES 9, 10 and 11 for the conventional square drive with kelly bushing drive pin sockets located as shown. With the split circular master bushing shown in FIGURES 6, 7 and 8, the driving forces and centrifugal force will always tend to hold the bushing sections outward against the opening in the rotary table, but with the construction shown in FIGURES 9, 10 and 11, alternate inward and outward displacement of the master bushing sections 56 and 57 occurs within the rotary table drive recess 50.

From a consideration of the force diagrams of FIGURES 6, 7, and 8, it is apparent that the maximum benefits in maintaining each master bushing section in contact with the rotary table opening is achieved when the pin drive socket remote from the driving lug on that section is positioned as close as practicable to the confronting faces of the master bushing sections.

Figure 2:
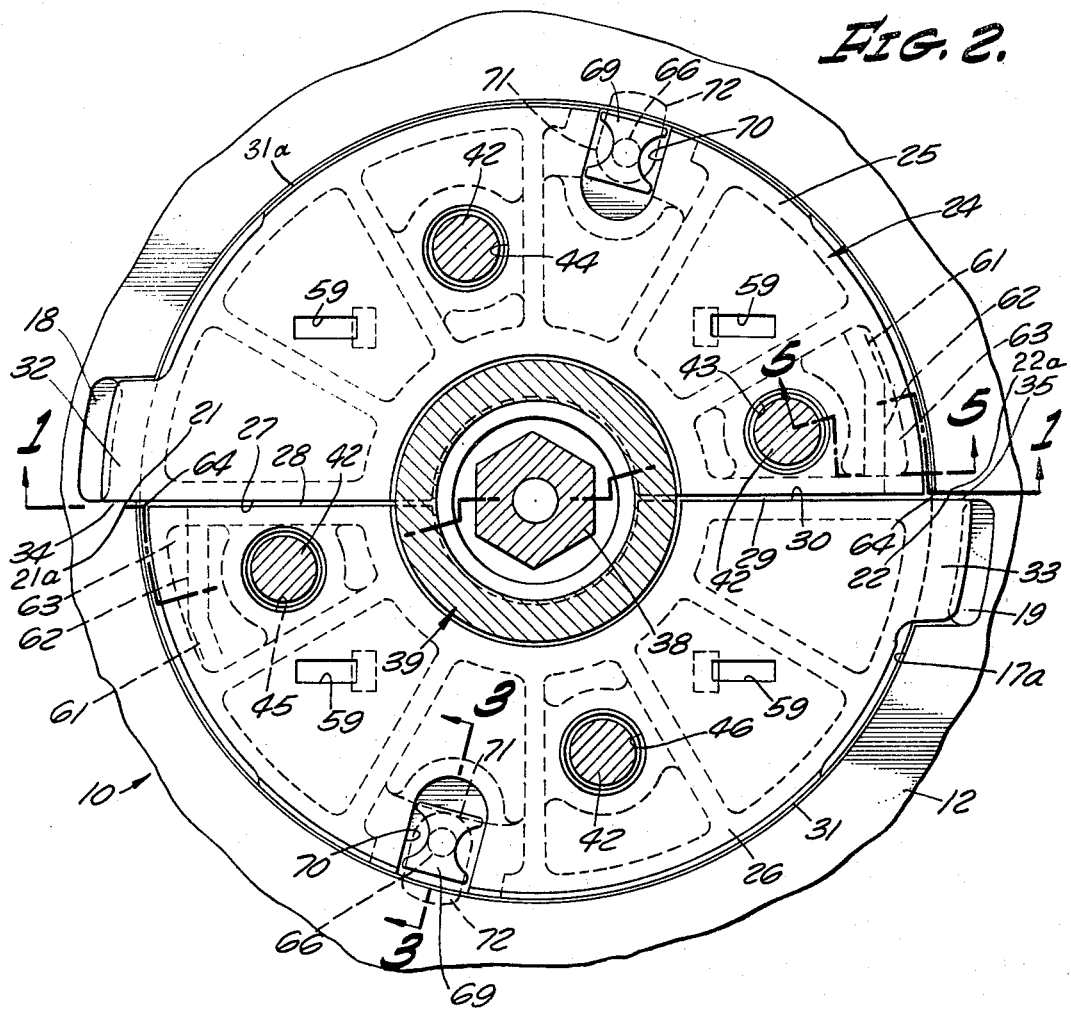
FIGURE 2 is a sectional plan view taken substantially on the lines 2—2 as shown in FIGURE 1.

The sections 25 and 26 of the master bushing 24 may be removed separately from the opening 17 in the rotary table 12, after the kelly bushing 39 and kelly 38 have been removed. As shown in FIGURE 2, openings 59 are provided in the upper surface of each master bushing section, and a pair of hooks on a sling (not shown) may be inserted into these openings. The location of the openings 59 is chosen so that tilting movement of each bushing is minimized when it is lifted by hooks inserted into these openings.

In order to facilitate installation and removal of the master bushing sections 25 and 26 with respect to the rotary table 12, the outer wall 61 of each bushing section, which wall is otherwise circular, is provided with a straight portion 62 at a location remote from the driving lug on that bushing section. A clearance space 63 is thus formed between the short straight portion 62 and the circular opening 17 in the rotary table 12. This clearance space 63 insures that adequate clearance develops between the circular opening 17 and the outer circular wall 61 of the bushing section when the bushing section swings through a small arc around the corner 64 at the intersection of the opening 17 and the radial face of the driving lug.

Figure 3:
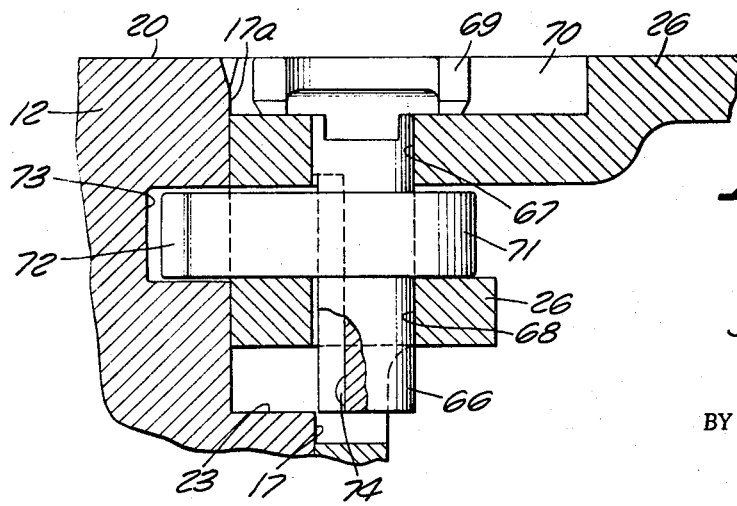
FIGURE 3 is a fragmentary sectional view taken substantially on the lines 3—3 as shown in FIGURE 2.
Figures 4, 5:
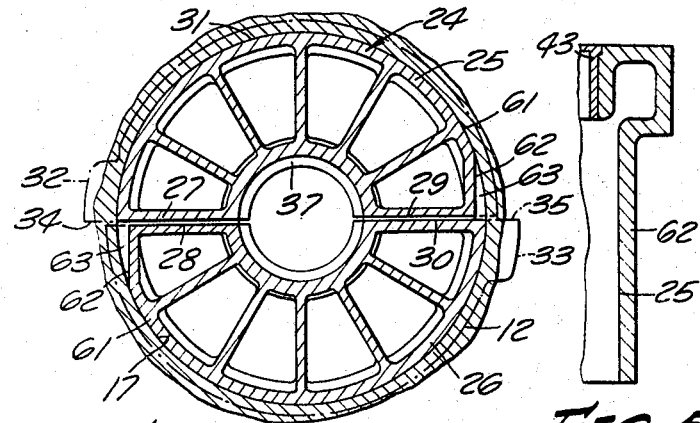
FIGURE 4 is a sectional view partly broken away taken substantially on the lines 4—4 as shown in FIGURE 1, and shown on a smaller scale.
FIGURE 5 is a sectional detail taken substantially on the lines 5—5 as shown on FIGURE 2.

Means are provided for releasably latching the master bushing sections 25 and 26 against upward movement relative to the rotary table 12. As shown in FIGURE 3, this means includes a latch actuating pin 66 mounted to turn and slide vertically within aligned openings 67 and 68 on the bushing section 26. The latch pin 66 has an integral enlarged head 69 of non-circular outline and resting in the non-circular recess 70 provided in the upper surface of the bushing section. The pin 66 is slidably keyed to the latch element 71 which has a projecting portion 72 adapted to enter the latch recess 73 provided on the rotary table 12. When the latch is to be operated, the enlarged head 69 is grasped manually, lifted upward out of the recess 70, and then turned one-quarter turn. This moves the projecting portion 72 of the latch element 71 into or out of the latch recess 73. The head 69 is then allowed to descend by gravity back into the non-circular recess 70 to hold the latch element 71 in selected position. A weld bead 74 is provided to limit upward travel of the head 69 and latch pin 66.

In a modified form of the invention shown in FIGURES 12–15, the rotary table and the outer shape of the master bushing sections and the location of the pin drive sockets is the same as that previously described, but a split liner is provided within the central tapered bore defined by the master bushing sections. The master bushing sections are shown at 25a and 26a and each is provided with a single outward extending driving lug 32a and 33a as previously described. Split liner sections 75 and 76 are duplicates and are mounted within the central tapered bore 37a defined by the master bushing sections 25a and 26a. A positioning lug 77 on each liner section and a mating recess 78 on each master bushing section as shown in FIGURE 15 insures that the confronting faces 79 on the liner sections will always be perpendicular to the confronting faces 80 on the master bushing sections. This insures that both liner sections 75 and 76 must be removed from rotary table 12 before removing either master bushing section 25a or 26a, and thus any possibility of accidentally dropping the liner section down through the rotary table is eliminated.

When the liner sections 75 and 76 are removed, the tapered bore 37a in the master bushing sections may be employed with slips for handling large diameter pipe. A pair of hook receiving openings 81 are provided on each liner section to facilitate lifting it from the tapered bore in the master bushing sections. Also latch means are provided for latching the liner sections against upward movement relative to the master bushing sections. As shown in FIGURE 14, the latch element 71a is slidably keyed on the latch pin 66a so that when the latter is raised and turned by means of the enlarged head 69a the projecting portion 72a is swung into or out of the latch recess 73a.

Having fully described my invention, it is to be understood that I am not to be limited to the details herein set forth but that my invention is of the full scope of the appended claims.

I claim:

1. In a well drilling device, the combination of: a rotary table having a central circular opening and having a pair of diametrically positioned pockets, each pocket having a radial wall and a clearance wall spaced therefrom, a master bushing assembly having an outer circular surface mounted in said table opening, said master bushing assembly being split axially to form a pair of bushing sections having spaced confronting surfaces, each bushing section having a driving lug adjacent its confronting surface and extending outward beyond said surface into one of said pockets, respectively, and between the radial wall and clearance wall thereof, each of said lugs having a radial driving face engageable with one of said radial walls, respectively, and having another face spaced from one of said clearance walls, respectively.

2. In a well drilling device, the combination of: a rotary table having a central circular opening and having an upper surface provided with a pair of pockets diametrically positioned and extending into said opening, each pocket having a radial wall and a clearance wall spaced therefrom, a master bushing assembly having an outer circular surface mounted in said table opening, said master bushing assembly being split axially to form a pair of duplicate bushing sections having spaced confronting surfaces, each bushing section having a driving lug adjacent its confronting surface and extending outward beyond said outer surface into one of said pockets, respectively, and between the radial wall and clearance wall thereof, each of said lugs having a radial driving face engageable with one of said radial walls, respectively, and having another face spaced from one of said clearance walls, respectively.

3. In a well drilling device, the combination of: a rotary table having a central circular opening and having a pair of diametrically positioned pockets, a master bushing assembly having an outer circular surface mounted in said table opening, said master bushing assembly being split axially by parallel offset plane surfaces to form a pair of duplicate bushing sections with clearance between said plane surfaces, each bushing section having a driving lug extending outward beyond said outer surface into one of said pockets, respectively, each of said lugs having a radial driving face forming a continuation of one of said plane surfaces.

4. In a well drilling device, the combination of: a rotary table having a central circular opening and having an upper surface provided with a pair of pockets diametrically positioned and extending to said opening, each pocket having a radial wall, a master bushing assembly having an outer circular surface mounted in said table opening, said master bushing assembly being split axially by parallel offset plane surfaces to form a pair of duplicate bushing sections with clearance between said plane surfaces, each bushing section having a driving lug extending outward beyond said outer surface into one of said pockets, respectively, each of said lugs having a radial driving face forming a continuation of one of said plane surfaces and engageable with one of said radial walls, respectively.

5. In a well drilling device, the combination of: a rotary table having a central circular opening and having a pair of diametrically positioned pockets, each pocket having a radial wall, a master bushing assembly having an outer circular surface mounted in said table opening, said master bushing assembly being split axially to form a pair of duplicate bushing sections with confronting surfaces, each bushing section having a driving lug extending outward beyond said outer surface into one of said pockets, respectively, each of said lugs having a radial driving face engageable with one of said radial walls, respectively, the outer circular surface of each master bushing section being relieved at a location adjacent a confronting surface and remote from the lug on that master bushing section, whereby clearance spaces are formed within the circular opening of the rotary table to facilitate removal of the master bushing sections from the rotary table opening.

6. In a well drilling device, the combination of: a rotary table having a central circular opening and having a pair of diametrically positioned pockets, each pocket having a radial wall, a master bushing assembly having an outer circular surface mounted in said table opening and having a central bore, said master bushing assembly being split axially to form a pair of duplicate bushing sections with confronting surfaces, each bushing section having a driving lug extending outward beyond said outer surface into one of said pockets, respectively, each of said lugs having a radial driving face engageable with one of said radial walls, respectively, a liner having a taper bore and mounted in the central bore of the master bushing assembly, the liner being split axially to form duplicate liner sections with confronting surfaces, and interengaging means on the liner and master bushing sections acting to maintain the confronting surfaces of the liner at right angles to the confronting surfaces on the master bushing sections.

7. For use with a well drilling rotary table having a central circular opening, the combination of: a master bushing assembly having a circular outer surface for reception in the circular opening of the table, said master bushing assembly being split axially by parallel offset plane surfaces to form a pair of duplicate bushing sections with clearance between said plane surfaces, each bushing section having a driving lug extending outward beyond said outer circular surface and having a radial driving face forming a continuation of one of said plane surfaces.

8. For use with a well drilling rotary table having a central circular opening, the combination of: a master bushing assembly having a circular outer surface for reception in the circular table opening, said master bushing assembly being split axially to form a pair of duplicate bushing sections having confronting surfaces, each bushing section having a driving lug extending outward beyond said outer circular surface and having a radial driving face forming a continuation of one of the confronting surfaces, the outer circular surface of each master bushing section being relieved at a location adjacent a confronting surface and remote from the lug on that master bushing section, whereby clearance spaces are formed within the circular opening of the rotary table to facilitate removal of the master bushing sections from the rotary table opening.

9. For use with a well drilling rotary table having a central circular opening, the combination of: a master bushing assembly having an outer surface for reception in the table opening and having a central bore, said master bushing assembly being split axially to form a pair of duplicate bushing sections, each bushing section having a driving lug extending outward beyond said outer surface and having a radial driving face adjacent one of the confronting surfaces, a liner having a taper bore and mounted in the central bore of the master bushing assembly, the liner being split axially to form duplicate liner sections with confronting surfaces, and interengaging means on the liner and master bushing sections acting to maintain the confronting surfaces of the liner at right angles to the confronting surfaces on the master bushing sections.

10. In a well drilling device, the combination of: a rotary table having a central circular opening, a master bushing assembly having an outer circular surface mounted in said table opening, said master bushing assembly being split axially to form a pair of bushing sections, means for driving each master bushing section from said table, a kelly bushing having four parallel downward extending equally spaced driving pins, said master bushing sections each having two pin sockets for reception of said driving pins, one of said pin sockets on each bushing section lying substantially closer than the other pin socket to the other bushing section.

11. In a well drilling device, the combination of: a rotary table having a central circular opening, a master bushing assembly having an outer circular surface mounted in said table opening, said master bushing assembly being split axially to form a pair of duplicate bushing sections having confronting surfaces, means for driving each bushing section from said table, a kelly bushing having four parallel downward extending equally spaced driving pins, said master bushing sections each having two pin sockets for reception of said driving pins, one of said pin sockets on each bushing section lying substantially closer than the other pin socket to said confronting surfaces.

12. In a well drilling device, the combination of: a rotary table having a central circular opening and having a pair of diametrically positioned pockets, a master bushing assembly having an outer circular surface mounted in said table opening, said master bushing assembly being split axially to form a pair of duplicate bushing sections having confronting surfaces, each bushing section having a driving lug extending outward beyond said outer surface into one of said pockets, respectively, a kelly bushing having four parallel downward extending equally spaced driving pins, said master bushing sections each having two pin sockets for reception of said driving pins, one of said pin sockets on each bushing section lying substantially closer than the other pin socket to said confronting surfaces.

13. In a well drilling device, the combination of: a rotary table having a central circular opening and having an upper surface provided with a pair of pockets diametrically positioned and extending to said opening, each pocket having a radial wall, a master bushing assembly having an outer circular surface mounted in said table opening, said master bushing assembly being split axially to form a pair of duplicate bushing sections having confronting surfaces, each bushing section having a driving lug extending outward beyond said outer surface into one of said pockets, respectively, each lug having a radial driving face engaging one of said radial walls, respectively, a kelly bushing having four parallel downward extending equally spaced driving pins, said master bushing sections each having two pin sockets for reception of said driving pins, one of said pin sockets on each bushing section being positioned adjacent to said confronting surfaces, and the other pin socket on each bushing section being remote from said confronting surfaces.

14. For use with a well drilling rotary table having a circular central opening, the combination of: a master bushing assembly adapted for reception in the table opening, said master bushing assembly having an upper surface provided with four equally spaced upward opening parallel pin sockets, said master bushing assembly being split axially to form a pair of bushing sections, each with two of said pin sockets, one of said pin sockets on each master bushing section lying substantially closer than the other pin socket to the other bushing section, and each master bushing section having means whereby it may be driven from the rotary table.

15. For use with a well drilling rotary table having a circular central opening, the combination of: a master bushing assembly adapted for reception in the table opening, said master bushing assembly having an upper surface provided with four equally spaced upward opening pin sockets, said master bushing assembly being split axially to form a pair of duplicate bushing sections having confronting surfaces, each master bushing section having two of said pin sockets, one of said pin sockets on each master bushing section lying substantially closer than the other pin socket to said confronting surfaces, and each master bushing section having means whereby it may be driven from said rotary table.

16. For use with a well drilling rotary table having a circular central opening, the combination of: a master bushing assembly adapted for reception in the table opening, said master bushing assembly having an upper surface provided with four equally spaced upward opening pin sockets, said master bushing assembly being split axially to form a pair of duplicate bushing sections having confronting surfaces, each bushing section having an outward extending driving lug adjacent said confronting surfaces whereby the bushing section may be driven from the rotary table, each master bushing section having two of said pin sockets, one of said pin sockets on each bushing section lying remote from the driving lug and substantially closer than the other pin socket to said confronting surfaces.

References Cited

UNITED STATES PATENTS

| | | | |
|---|---|---|---|
| 450,656 | 4/1891 | Beal | 64—23.5 |
| 1,892,690 | 1/1933 | Witkin | 64—23.5 |
| 1,976,057 | 10/1934 | Zilen | 64—23.7 |
| 2,075,028 | 3/1937 | Driscoll | 64—23.5 |
| 2,183,012 | 12/1939 | Davidson | 64—23.5 |
| 2,204,645 | 6/1940 | Baash | 64—23.5 |
| 2,306,130 | 12/1942 | Long | 64—23.7 |
| 2,344,746 | 3/1944 | Spalding | 64—23.5 |
| 2,904,311 | 9/1959 | Spiri | 64—23.7 |

HALL C. COE, *Primary Examiner.*